United States Patent
Handy et al.

(10) Patent No.: US 9,926,000 B2
(45) Date of Patent: Mar. 27, 2018

(54) TELESCOPIC SHROUD FOR A STEERING COLUMN ASSEMBLY

(71) Applicant: TRW Limited, Solihull West Midlands (GB)

(72) Inventors: Colin Handy, Coventry West Midlands (GB); Niclas Davies, Birmingham West Midlands (GB)

(73) Assignee: TRW Limited, Solihull, West Midlands (GB)

( * ) Notice: Subject to any disclaimer, the term of this patent is extended or adjusted under 35 U.S.C. 154(b) by 0 days.

(21) Appl. No.: 15/120,335

(22) PCT Filed: Feb. 20, 2015

(86) PCT No.: PCT/GB2015/050499
§ 371 (c)(1),
(2) Date: Aug. 19, 2016

(87) PCT Pub. No.: WO2015/124944
PCT Pub. Date: Aug. 27, 2015

(65) Prior Publication Data
US 2017/0057537 A1    Mar. 2, 2017

(30) Foreign Application Priority Data
Feb. 21, 2014    (GB) .................................. 1403098.5

(51) Int. Cl.
*B62D 1/16* (2006.01)
*B62D 1/184* (2006.01)
*B62D 1/185* (2006.01)

(52) U.S. Cl.
CPC ............. *B62D 1/184* (2013.01); *B62D 1/185* (2013.01)

(58) Field of Classification Search
CPC .......... B62D 1/184; B62D 1/18; B62D 1/187; B62D 1/185
(Continued)

(56) References Cited

U.S. PATENT DOCUMENTS

| 9,079,610 | B2 * | 7/2015 | Kwon ................... B62D 1/184 |
| 2010/0000366 | A1 * | 1/2010 | Nomura ................. B62D 1/184 74/493 |

(Continued)

FOREIGN PATENT DOCUMENTS

| DE | 102010048952 A1 | 6/2011 |
| EP | 1790550 A1 | 5/2007 |

(Continued)

OTHER PUBLICATIONS

PCT International Search Report and Written Opinion, Application No. PCT/GB2015/050499 dated Jun. 5, 2015.
(Continued)

*Primary Examiner* — Toan To
(74) *Attorney, Agent, or Firm* — MacMillan, Sobanski & Todd, LLC (57) ABSTRACT

An adjustable steering column assembly comprises a telescopic shroud which comprises an outer tubular portion and an inner tubular portion where the overall length can be adjusted by relative movement of the two portions, a support bracket secured to a fixed part of a vehicle and a releasable clamp assembly which is movable between an unclamped position in which the shroud can be adjusted telescopically and a clamped position in which the outer tubular portion clamps onto the inner tubular portion thereby preventing telescopic movement of the shroud during normal use of the assembly. The outer tubular portion includes an elongated slot and two clamp rails, each located on a respective side of the slot and including an elongated opening through which
(Continued)

a clamp bolt of the clamp assembly passes. At least one of the rails varies in cross-section at the various positions at which the rails may be clamped such that, in use, the rails resiliently deform when the assembly is in the clamped position by an amount dependent on the relative telescopic position of the inner and outer tubular portions.

18 Claims, 8 Drawing Sheets

(58) Field of Classification Search
USPC .......................... 280/775, 777; 74/492, 493
See application file for complete search history.

(56) References Cited

U.S. PATENT DOCUMENTS

| | | | | |
|---|---|---|---|---|
| 2010/0242664 A1* | 9/2010 | Thompson | ............. | B62D 1/184 74/493 |
| 2011/0041642 A1* | 2/2011 | Havlicek | ................ | B62D 1/184 74/493 |
| 2011/0088501 A1* | 4/2011 | Park | ....................... | B62D 1/184 74/493 |
| 2011/0265599 A1* | 11/2011 | Owens | ................... | B62D 1/184 74/493 |
| 2013/0042716 A1* | 2/2013 | Davies | ................... | B62D 1/195 74/493 |
| 2014/0196564 A1* | 7/2014 | Bang | ...................... | B62D 1/184 74/493 |
| 2014/0305251 A1* | 10/2014 | Wilkes | ................... | B62D 1/184 74/493 |
| 2014/0311274 A1* | 10/2014 | Hong | ..................... | B62D 1/184 74/493 |
| 2015/0107398 A1* | 4/2015 | Nagasawa | .............. | B22D 17/00 74/493 |
| 2015/0266499 A1* | 9/2015 | Yoshihara | .............. | B62D 1/184 74/493 |

FOREIGN PATENT DOCUMENTS

| | | |
|---|---|---|
| WO | 2010026554 A2 | 3/2010 |
| WO | 2013066063 A1 | 5/2013 |

OTHER PUBLICATIONS

Patents Act 1977: Search Report, Application No. GB1403098.5 dated Sep. 4, 2014.

* cited by examiner

TELESCOPIC SHROUD FOR A STEERING COLUMN ASSEMBLY

CROSS-REFERENCE TO RELATED APPLICATIONS

This application is a national stage of International Application No. PCT/GB2015/050499, filed 20 Feb. 2015, the disclosures of which are incorporated herein by reference in entirety, and which claimed priority to Great Britain Patent Application No. 1403098.5, filed 21 Feb. 2014, the disclosures of which are incorporated herein by reference in entirety.

BACKGROUND OF THE INVENTION

This invention relates to improvements to adjustable steering column assemblies for vehicles.

Steering column assemblies for automotive vehicles and the like are increasingly required to be adjustable for steering wheel height known as rake and, in many cases, steering wheel distance known as reach. This requires the column shroud, within which the steering column shaft attached to the steering wheel is rotatably located, to be fixed to the vehicle by a clamp mechanism which can be clamped and unclamped to either prevent or permit adjustment of the column shroud position respectively.

A typical adjustable steering column assembly comprises a first shroud portion, a second shroud portion and a clamp mechanism that includes a bracket secured to a fixed part of a vehicle and in which the first and second portions are releasably engaged by the clamp mechanism to selectively permit an amount of relative movement between the first and second portions that is required during adjustment of the steering column assembly. The clamp mechanism can be unclamped and clamped by movement of a locking lever or handle or, sometimes, electrically using a motor or perhaps hydraulically or pneumatically. However the present invention focuses on the lever locking mechanism.

By releasing the clamp mechanism and telescopically sliding the first portion over the second portion the length of the shroud can be altered, altering the reach position of an associated steering wheel. By moving both portions together up and down relative to the clamp mechanism the rake can be adjusted. In some assemblies only one of reach and rake may be adjusted. The clamp mechanism may clamp the shroud to a bracket (known as a support bracket) which is connected to the vehicle. Thus, when the clamp mechanism is clamped the length of the steering column assembly is fixed, and it is prevented from moving due to the rigid connection through the bracket to the vehicle.

The mechanism is clamped by movement of a lever which is generally easily accessible to a user from the driver's seat of a vehicle. However it has been found that the force or effort that must be exerted (by a user of the lever) differs considerably depending on the reach position of the steering column assembly when being clamped.

BRIEF SUMMARY OF THE INVENTION

According to a first aspect, the invention provides an adjustable steering column assembly, comprising a telescopic shroud which comprises an outer tubular portion and an inner tubular portion wherein the outer portion receives the inner portion such that the overall length of the shroud can be adjusted by relative movement of the two portions, a support bracket that in use is secured to a fixed part of a vehicle and a releasable clamp assembly which is movable between an unclamped position in which the shroud can be adjusted telescopically and a clamped position in which the outer tubular portion clamps onto the inner tubular portion thereby preventing telescopic movement of the shroud during normal use of the assembly, in which the outer tubular portion includes an elongated slot and two clamp rails, each located on a respective side of the slot and including an elongated opening through which a clamp bolt of the clamp assembly passes, the clamp assembly locking the shroud relative to the support bracket when in the clamped position, characterised in that at least one of the rails varies in cross-section at the various positions at which the rails may be clamped such that, in use, the rails resiliently deform when the assembly is in the clamped position by an amount dependent on the relative telescopic position of the inner and outer tubular portions due to differences in the cross-section of the rail at any given position.

The variation in cross-section of the clamp rails may be arranged such that the difference in the clamping force carried by the clamp bolt when the assembly is in any of the permissible clamped positions, between the shroud being fully extended and fully collapsed, is less than would be present with the rails having uniform cross-section with all other things being equal.

In at least one arrangement the variation in cross-section may contribute to this variation being less than 40 percent, or less than 20 percent, or less than 10 percent or approaching zero variation.

It has now been found by the Applicant that the difference in required exerted force by the user is due, at least in part, to the fact that the stiffness of the shroud being clamped varies greatly depending on its telescopic position. The change to the amount of deformation which occurs at different telescopic shroud positions has been found to relate to the active elongated slot length, the shroud being less stiff with increasing active elongated slot length and more stiff with decreasing active elongated slot length.

Active elongated slot length is the distance between clamped position of the clamp rails and the closed end of the elongated slot. The active elongated slot length differs when the shroud is clamped at different telescopic positions, the length being shorter when the telescopic shroud is collapsed and longer when the telescopic shroud is extended. As such, while the elongated slot length remains constant, the active elongated slot length varies with telescopic position.

During adjustment of the assembly, the inner tubular portion may be fixed and the outer tubular portion may move relative to the support bracket causing the outer tubular portion to also move relative to the clamp bolt. This movement may ultimately be limited by the elongated opening length in the clamp rails.

In one embodiment, by varying the cross-section of at least one of the clamp rails at different positions, the clamp rails will deform by a greater amount when the shroud is at its shortest length and a lesser amount when it is at a longer length due to a difference in cross-section of the clamp rail at the point that the clamp bolt passes through i.e. the clamp position.

The cross-section of both the rails may vary along the length of the rail.

In one embodiment, the variation in cross-section is achieved by making the thickness of each rail, measured in the axial direction of the clamp bolt, vary along the length of the rail.

In a particular embodiment, one or both of the rails may be tapered so that one or both rails are thicker at the end which is closest to the free end of the outer tubular portion which surrounds the inner tubular portion and is thinner at distances further along the outer tubular portion, the width being measured in the axial direction of the clamp bolt.

The sides of each clamp rail which face the support bracket may be parallel to each other, whereas opposite sides need not be parallel to each other.

In one embodiment, the outer tubular portion of the telescopic shroud is closer to the steering wheel than the inner tubular portion.

Optionally the outer tubular portion may be a casting where the rails are cast as an integral part of the tubular portion.

The varying deformation of the rails with differences in shroud position/active elongated slot length may combine with the varying deformation of the slot with shroud position/active elongated slot length to provide a more uniform clamp force in moving from the unclamped to the clamped position compared with rails that do not have varying cross-section along their length.

In one embodiment, the steering column assembly comprises the releasable clamp assembly that clamps the telescopic shroud in position relative to the support bracket, the clamp assembly including the clamp bolt onto which are stacked: two tapered clamp rails wherein the thickness of each rail, measured in the axial direction of the clamp bolt, varies along the length of the rail, of the telescopic shroud of the steering assembly each located on a respective side of the elongated slot of the shroud, the clamp rails including an elongated opening through which the clamp bolt of the clamp assembly passes, thus locking the shroud relative to the support bracket when in the clamped position, a cam mechanism comprising a fixed cam part and a moving cam part, the two parts each having a bore through which the clamp bolt passes, a thrust bearing and a locking nut which includes an internal thread that engages a complimentary thread on the clamp bolt and which is clamped down so as to apply an axial load to the thrust bearing.

Other advantages of this invention will become apparent to those skilled in the art from the following detailed description of the preferred embodiments, when read in light of the accompanying drawings.

DETAILED DESCRIPTION OF THE INVENTION

Figure 1:
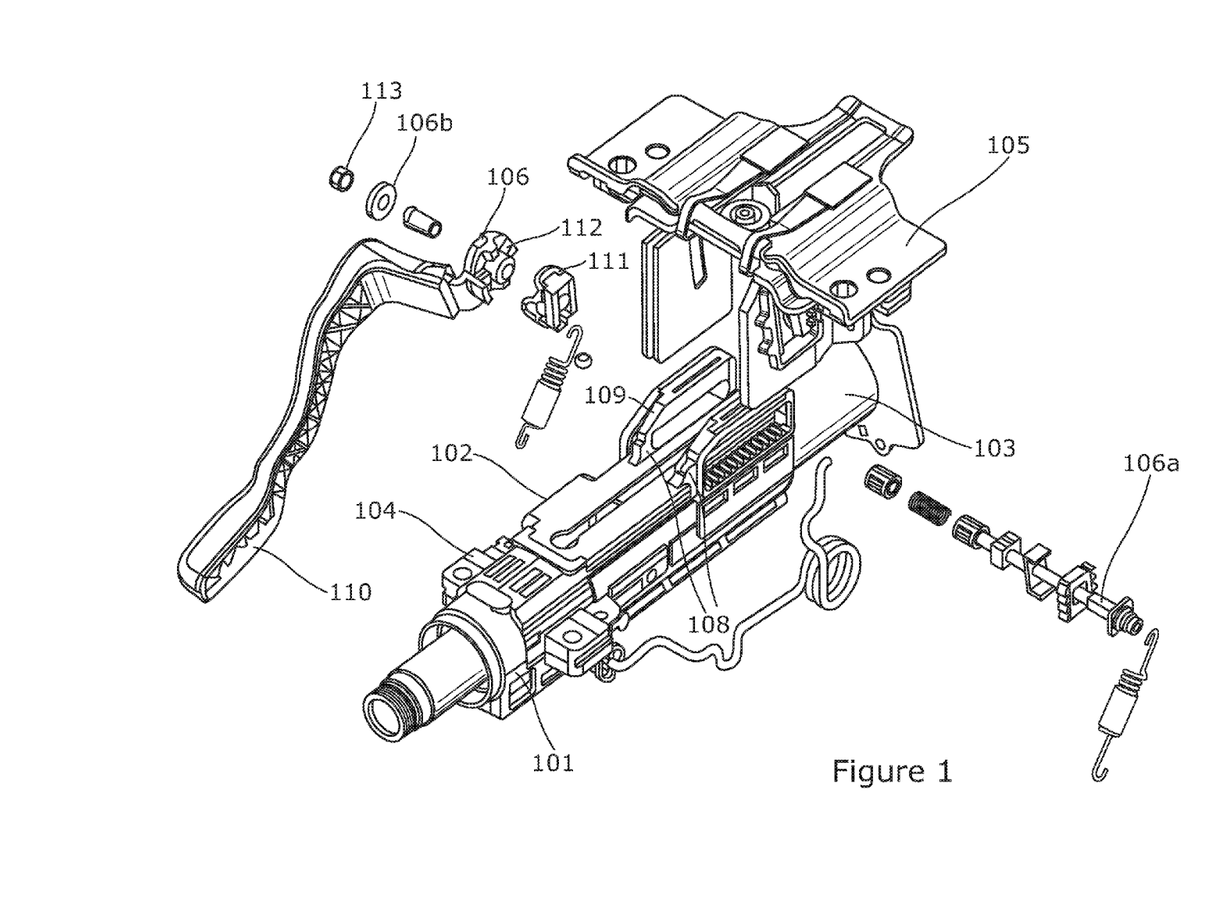
FIG. 1 is a view of a known steering column assembly.

FIG. 1 is a view of a known adjustable steering column assembly 101. The assembly 101 comprises a telescopic shroud 102, the shroud 102 comprising an inner tubular portion 103 which is received within an outer tubular portion 104, such that the overall length of the shroud 102 can be adjusted by relative movement of the two portions 103, 104.

Also seen in this figure is a support bracket 105, which is secured to a fixed part of the vehicle (not shown).

The figure shows a releasable clamp assembly 106. The outer tubular portion (104) is movable relative to the clamp assembly 106 between an unclamped position, in which the shroud 102 can be adjusted telescopically, and a clamped position, in which the outer shroud portion 104 clamps onto the inner shroud portion 103 thereby preventing telescopic movement of the shroud 102 during normal use of the assembly 101.

The outer tubular portion 104 includes an elongated slot 107 and two clamp rails 108, each rail 108 being located on a respective side of the slot 107. The clamp rails 108 include an elongated opening 109 through which a clamp bolt 106a of the clamp assembly 106 passes. The clamp assembly 106 locks the shroud 102 relative to the support bracket 105 when in the clamped position.

This figure also includes a lever 110 which can be operated by the user. The lever 110 comprises a cam 111 which engages with a cam follower 112. A cam assembly comprises the cam 111 and cam follower 112. Movement of lever 110 from a first position to a second position thus causes rotary movement of the cam follower 112 and axial movement of the clamp bolt 106a which results in the clamping assembly 106 switching between the unclamped and clamped positions. As a result, the arms of bracket 105, and hence the rails 108, are pulled together under the clamping force.

Also present is a locking nut 113 which includes an internal thread that engages a complementary thread on the clamp bolt.

Present in the assembly 106 is a thrust bearing 106b which supports the axial load.

Figure 2:
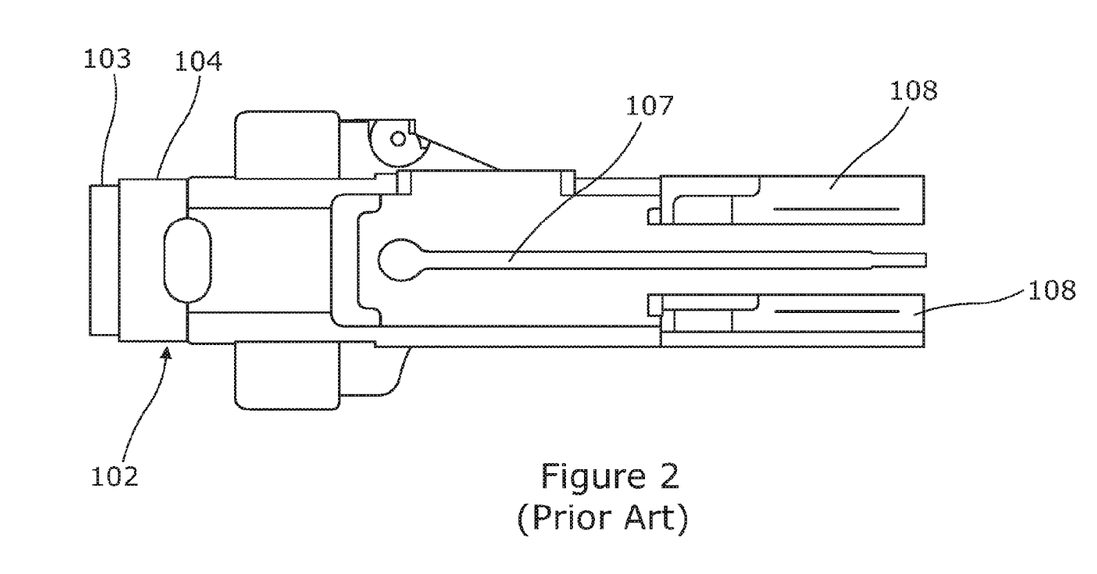
FIG. 2 is a plan view of the shroud of the steering column assembly of FIG. 1.

FIG. 2 is a plan view of the shroud 102 of the steering column assembly 101 of FIG. 1. Visible is the elongated slot 107 of the outer tubular portion 104. The clamp rails 108 of the outer tubular portion 104 are clamped by the clamp assembly 106 when the assembly 106 is in the clamped position. The clamping force is transmitted from the clamp rails 108 to the outer tubular portion 104 and thus causes deformation of the outer tubular portion 104. This also leads to the elongated slot 107 being partially closed up. However in this known assembly 101, the relative telescopic position will have a large effect on the amount of force which must be exerted by the user on the lever 110. This is because when the shroud 102 is at its shortest length, the active elongated slot 107 length is also shorter and the outer tubular portion 104 is therefore stiffer. When the shroud 102 is at its longest, the active elongated slot length is greater (by the length of telescopic adjustment) and therefore has a lower stiffness.

Figure 3:
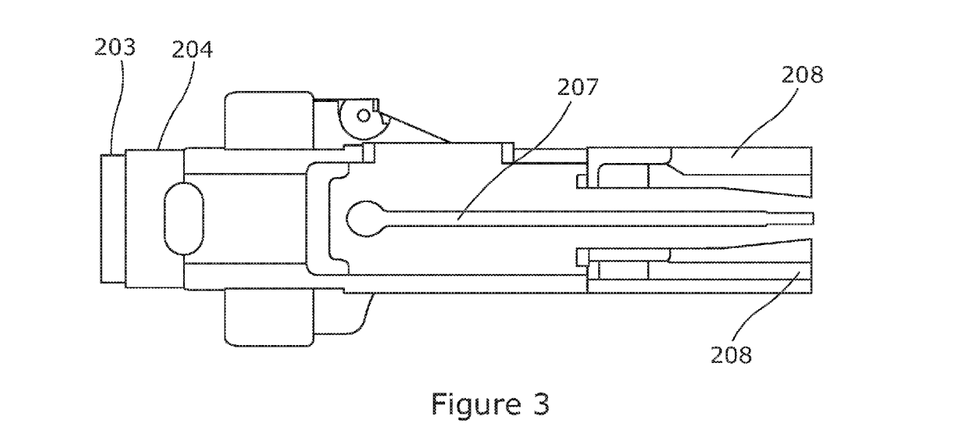
FIG. 3 is a plan view of a telescopic shroud of an embodiment of the present invention.

FIG. 3 shows a view of a telescopic shroud 202 of a steering column assembly 201 of an embodiment of the present invention. The telescopic shroud 202 differs from that of FIG. 1 in that the clamp rails 208 are configured so that when the outer tubular portion 204 moves from the unclamped to the clamped position, the clamp rails 208 resiliently deform by an amount dependent on the relative telescopic position of the outer tubular portions 204 in relation to the clamp assembly due the variation in cross-section of the rails 208 at different clamping positions. In this example the rails 208 are tapered along their length such that the rails 208 are thicker on one end and thinner on the other, however other methods of achieving varied cross-sections are possible. In addition, it is understood by the skilled man that other forms of thickness variation are possible as an alternative to a uniformly tapered variation of thickness.

In this embodiment, when moving the position of the outer shroud 104 when in the clamped position, the clamp assembly will clamp a thinner portion of the clamp rail 208 when the shroud 202 is collapsed and the active elongated slot length is shorter and will clamp a thicker, portion of the clamp rail 208 when the inner tubular portion 203 is extended and therefore when the active elongated slot length is longer. It will be understood that when the clamp assembly clamps the outer shroud 104 in a position of the clamp rail 208 which is thicker and thus less flexible, more force will be transmitted to the outer tubular portion 204. In contrast when the clamp assembly clamps the outer shroud 104 in a position of the clamp rail 208 which is thinner and thus more flexible, less force is transmitted to the outer tubular portion 204. In utilising this principle, a more uniform exertion of force upon the lever by the user is achieved when clamping different telescopic shroud positions, as combined deformation between the clamp rails 208 and the outer tubular portion 204 is more uniform.

Figure 4:
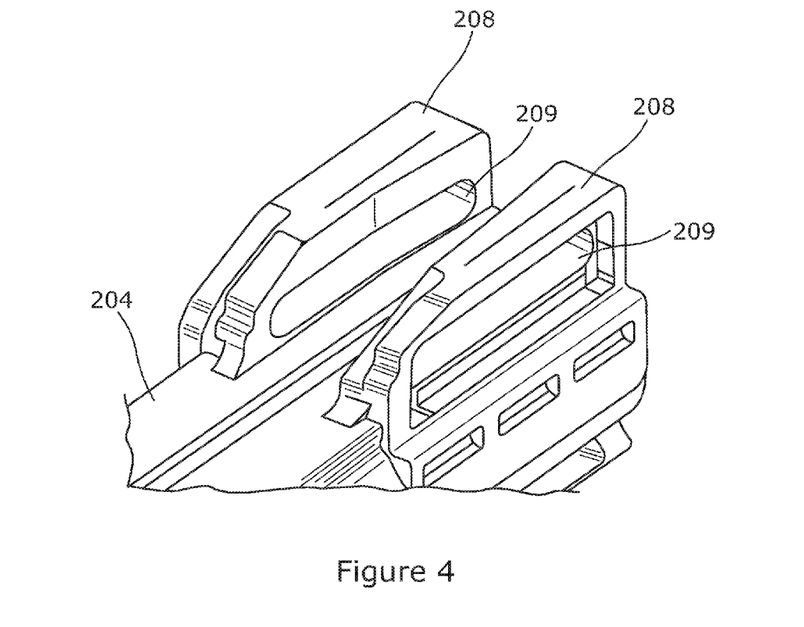
FIG. 4 is an angled view of the clamp rails of FIG. 3.

FIG. 4 is an angled view of the clamp rails 208 of the embodiment of the present invention described in FIG. 3. Different positions, which may be clamped on the clamp rails 208, are of different cross-sections. This is achieved by the fact that the clamp rails 208 are tapered along their length such that they are thicker on one end and thinner other the other. The elongated openings 209, not visible in FIG. 3 can be seen in FIG. 4. The clamp bolt passes through these openings 209 when the assembly 201 is in the clamped position. When the assembly is clamped and the shroud 202 is in a short, collapsed position, the clamp assembly will clamp a more flexible, thinner portion of the clamp rails. Therefore more deformation occurs in the rails 208. The active elongated slot length is small so the outer tubular portion 204 is stiff in this position. When the shroud 202 is extended and the active elongated slot length is long, the outer tubular portion 204 is more deformable while the portion of the rails 208 which is clamped is less flexible and thicker. Therefore more deformation around the elongated slot 207 of the outer tubular portion 204.

As the combined overall deformation between the clamp rails 208 and the outer tubular portion 204 is more uniform for both telescopic positions than in the known example of FIG. 1, so too is the force which must be exerted to successfully clamp the assembly.

Figure 5A:
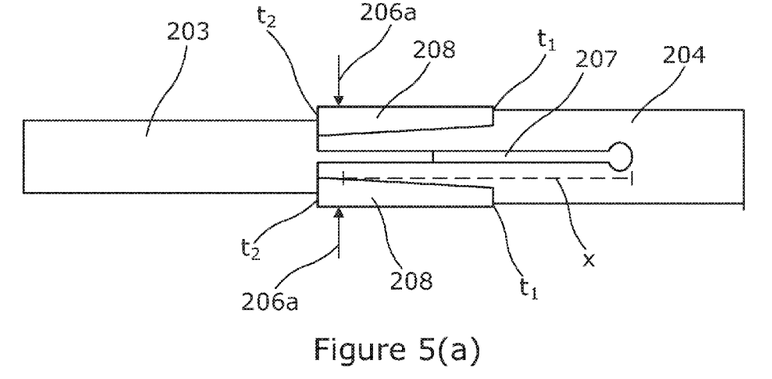
FIGS. 5(a) and (b) show the telescopic shroud of the present invention at different telescopic positions.
Figure 5B:
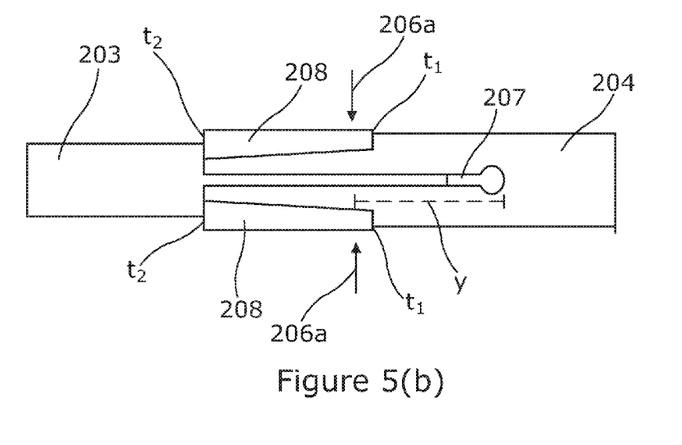

FIGS. 5(a) and (b) show the telescopic shroud 202 at different telescopic positions. Visible in these figures are the inner tubular portion 203, the outer tubular portion 204, the clamp rails 208 and the elongated slot 207.

FIG. 5(a) shows the telescopic shroud 202 at a telescopically extended position. As such the active elongated slot length X of the slot 207 is long. The thickness of each rail is at its greatest value, t2, at the position where the clamp bolt passes through the rails 206a.

FIG. 5(b) shows the telescopic shroud 202 at a telescopically collapsed position. As such the active elongated slot length Y of the slot 207 is short. The thickness of each rail is at its lowest value, t1, where the clamp bolt passes through the rails 206a.

Figure 6A:
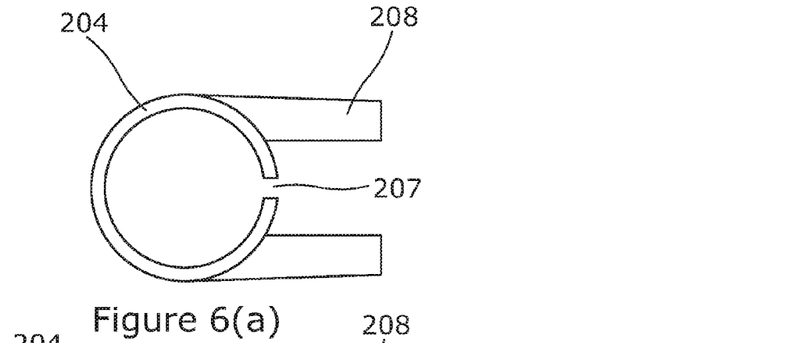
FIGS. 6(a) and (b) show diagrammatic representations of the deformation of the outer tubular portion and the clamp rails on the thicker end of the clamp rails according to an embodiment of the present invention.
Figure 6B:
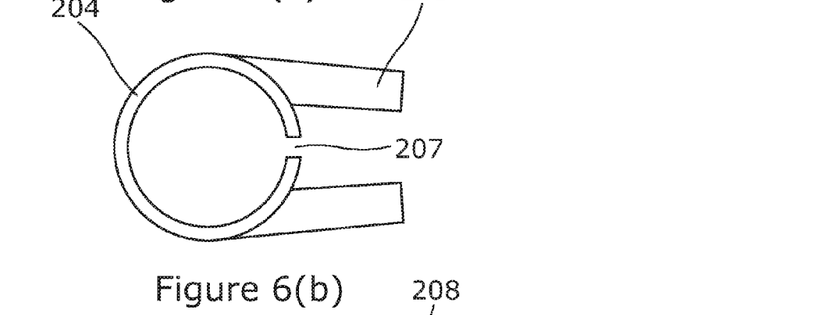

FIGS. 6(a) and (b) show diagrammatic representations of the deformation of the outer tubular portion 204 on a less flexible thicker end of the clamp rails 208 of an embodiment of the present invention, wherein the clamp rails 208 are tapered.

FIG. 6(a) shows the outer tubular portion 204 of an embodiment of the present invention when the assembly 201 is in the unclamped position.

FIG. 6(b) shows the embodiment of FIG. 6(a) but when in the clamped position. In this position, as the clamp rails 208 have been clamped at a less flexible, thicker end, the rails are relatively stiff and do not flex or deform much if at all. Instead much or all of the force is transmitted to the outer tubular portion 204 such that much or all of the deformation, which occurs due to the clamping force, occurs in the outer tubular portion 204 in the proximity of the slot 207. No portion of the rails 208 themselves is displaced, or is displaced much, relative to the position of attachment to the outer tubular portion 204.

As the active elongated slot length is long when the shroud 202 is extended, there is relatively little resistance to the deformation occurring on the outer tubular portion 204, when compared with the example of FIG. 7(b) below.

Figure 7A:
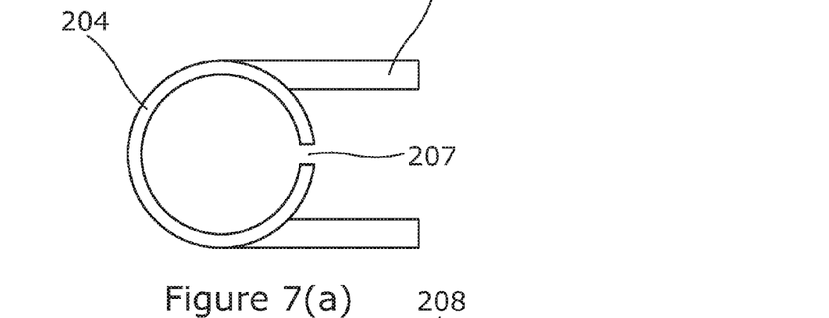
FIGS. 7(a) and (b) show diagrammatic representations of the deformation of the outer tubular portion and clamp rails on the thinner end of the clamp rails according to an embodiment of the present invention.

FIGS. 7(a) and (b) show diagrammatic representations of the deformation of the outer tubular portion 204 and clamp rails 208 on a more flexible, thinner end of the clamp rails 208 according to an embodiment of the present invention wherein the clamp rails 208 are tapered.

FIG. 7(a) shows the outer tubular portion 204 of an embodiment of the present invention when the assembly is in the unclamped position.

Figure 7B:
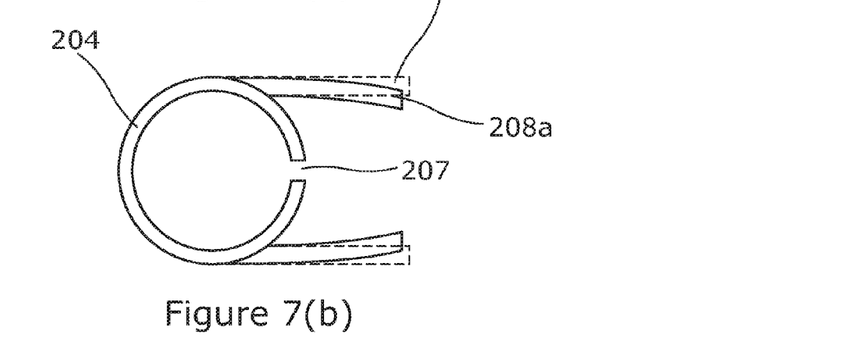

FIG. 7(b) shows the embodiment of FIG. 7(a) but when in the clamped position. In this position, as the clamp rails 208 have been clamped at the more flexible, thinner end, less force than in the example of FIG. 6(b) is transmitted to the outer tubular portion 204 such that much of the deformation which occurs due to the clamping force occurs in the clamp rails 208 themselves rather than the outer tubular portion 204. The deformation or flexing of the rails 208 relates to a displacement of a portion of the rails 208 in relation to their points of attachment on the outer tubular portion 204. Unclamped clamp rails 208a are visible in this figure for comparison.

In addition to the above, less deformation occurs on the outer tubular portion 204 because the shroud 202 is stiffer when the active elongated slot length is smaller as is the case when the shroud 202 is collapsed.

Figure 8:
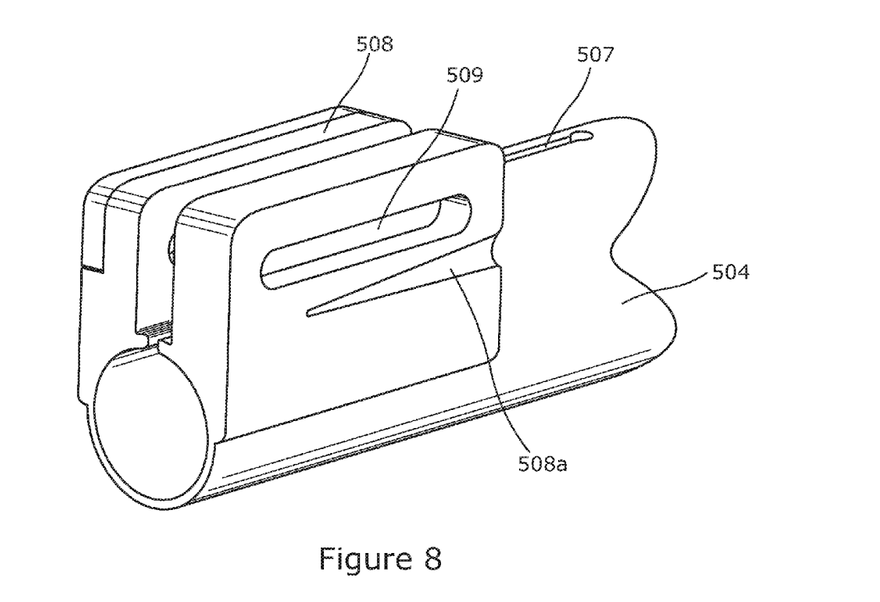
FIG. 8 shows an angled view of an embodiment of the present invention.

FIG. 8 shows an outer tubular portion 504 according to an embodiment of the present invention. The outer tubular portion 504 comprises an elongated slot 507 and clamp rails 508. Each clamp rail 504 comprises an elongated opening 509, through which a clamp bolt may clamp. In this embodiment the clamp rails 507 differ in cross-section at different potential clamping positions as they contain a groove 508a which runs along the length of each rail 208.

Figure 9A:
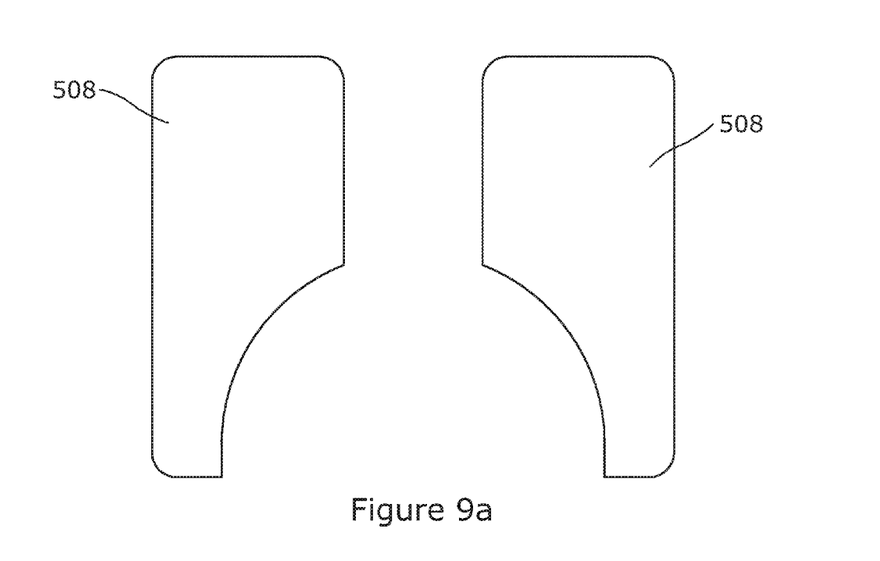
FIG. 9a shows a cross-sectional view of the clamp rails of FIG. 8 from an alternative view.
Figure 9B:
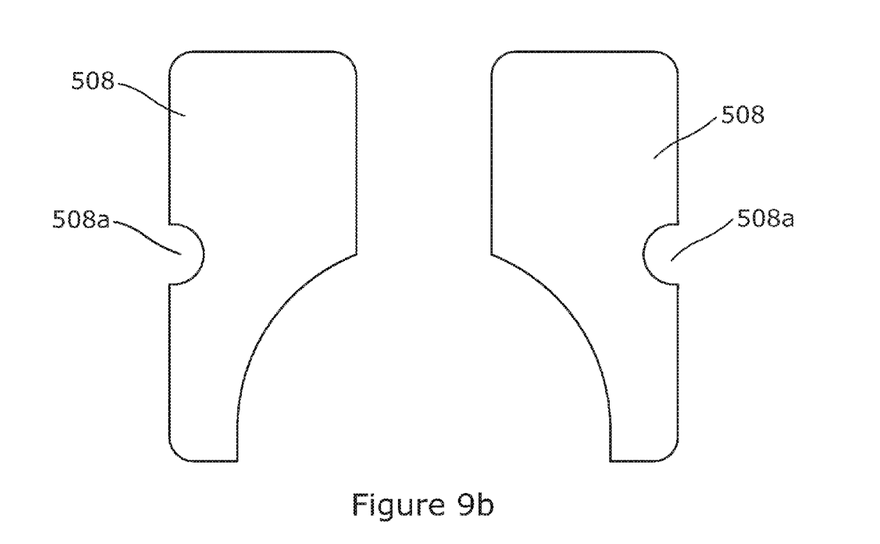
FIG. 9b shows a cross-sectional view of the clamp rails of FIG. 9a from a different clamping position.

FIGS. 9a and 9b shows the clamp rails 508 of FIG. 8 from an alternative view. In these figures the rails 508 are shown to be separate from the outer tubular portion 504, however this is purely to aid in explanation.

FIG. 9a shows the cross-section of the clamp rails 504 from the open elongated slot end. As can be seen in the figure, no groove is present in the cross-section of the rails 508 at this position. FIG. 9b shows the cross-section of the same rails shown in FIG. 9a, however FIG. 9b shows the cross-section of the rails nearer to the closed end of the elongated slot. The groove 508a is present in the cross-section of FIG. 9b. Therefore there is a difference in cross-section.

This difference in cross-section leads to a difference in flexibility of the rails 508 at different clamping positions.

Figure 10:
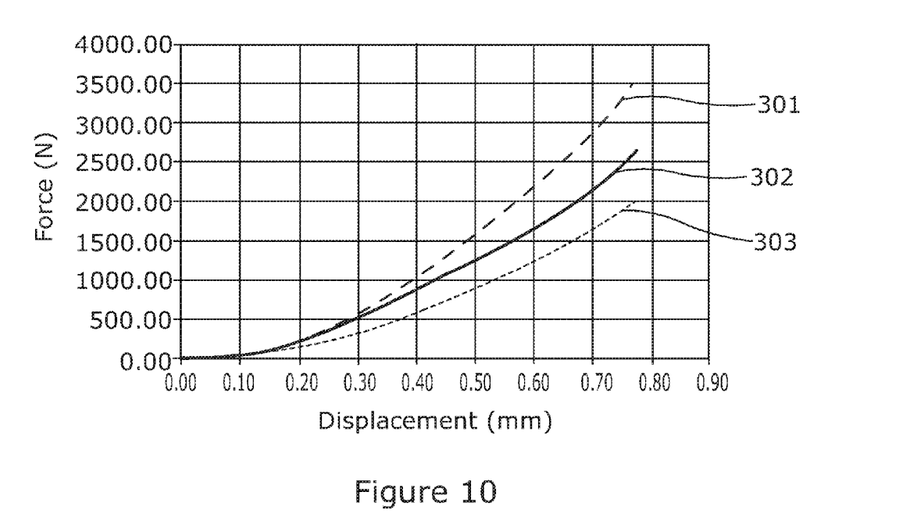
FIG. 10 shows a plot of force (N) against displacement (mm) of the clamp rails of a known steering column assembly when in the clamped position.

FIG. 10 shows a plot of the force (N) applied by the clamp bolt against displacement (mm) of the cam assembly (i.e. how much the bracket arms are pulled together). Line 301 relates to the clamped assembly when the shroud 102 is collapsed and when the inner tubular portion 103 is most present in the outer tubular portion 104. Therefore the active elongated slot length is short. Line 303 relates to the clamped assembly when the inner tubular portion 103 is least present in the outer tubular portion 104 when the telescopic shroud is extended. Therefore the active elongated slot length is long. Line 302 relates to the clamp assembly when the tubular inner portion 103 is at a nominal intermediate position within the outer tubular portion 104 between the maximum extension of the telescopic shroud 202, as in the case of line 303, and the minimum extension of the telescopic shroud, as in the case of line 301. Therefore, in the case of 302, the active elongated slot length is between the two extremes of the examples of lines 301 and 303.

A nominal force of 2600 N was tested and it was found that this force equated to a displacement of 0.77 mm in the case of line 302 (details of which are described above). All tests displayed in FIG. 10 looked for the force (N) required to cause this amount of displacement.

As can be seen in the plot, the force (N) required to cause 0.77 mm displacement by deformation varied by 1500 N between the tested examples of line 301 (3500 N) and line 303 (2000 N).

Figure 11:
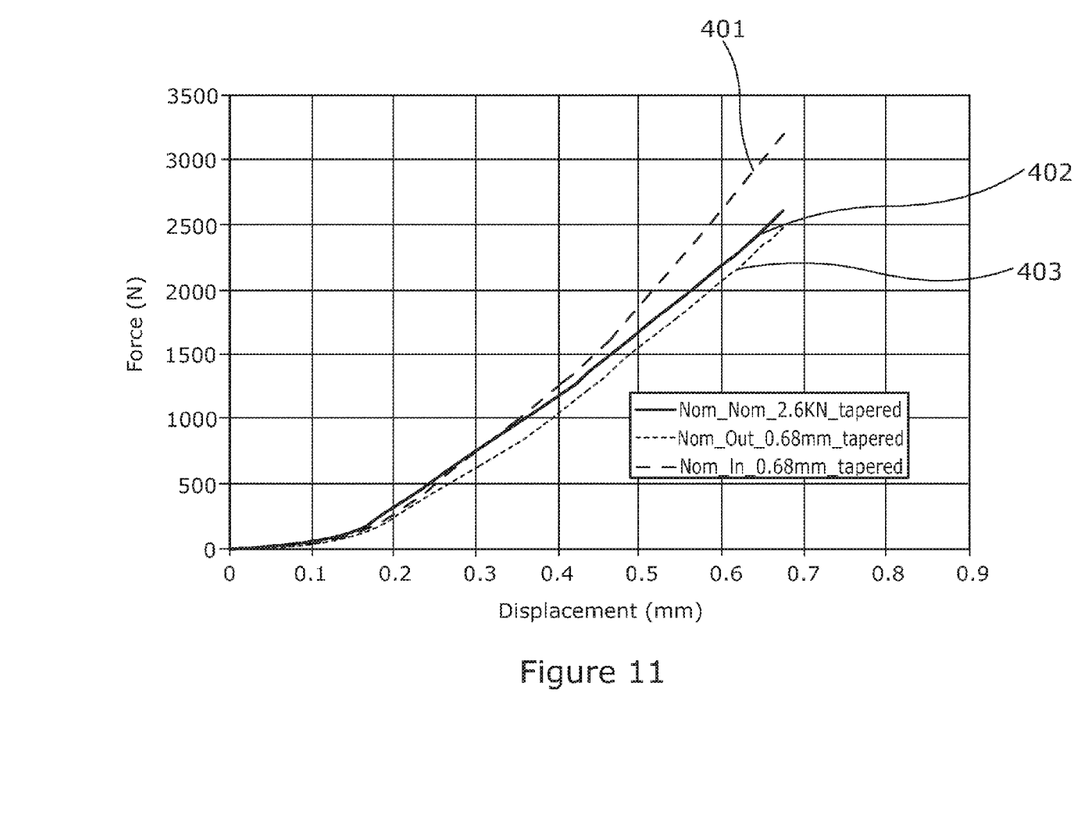
FIG. 11 shows a plot of force (N) against displacement (mm) of the clamp rails of an embodiment of the steering column assembly of the present invention when in the clamped position.

FIG. 11 shows a plot of force (N) applied by the clamp bolt against displacement (mm) of the cam assembly (i.e. how much the bracket arms are pulled together). Line 401 relates to the clamped assembly 201 when the telescopic shroud 202 is collapsed and most of the inner tubular portion 203 is present in the outer tubular region 204. Therefore the active elongated slot length is short. Line 403 relates to the clamped steering column assembly 201 when the telescopic shroud 202 is extended and the inner tubular portion is least present in the outer tubular portion 204. Therefore the active elongated slot length is long. Line 402 is related to the clamped steering column assembly 201 when the tubular inner portion 203 is at a nominal intermediate position within the outer tubular portion 204 between the maximum extension of the telescopic shroud 202, as in the case of line 403, and the minimum extension of the telescopic shroud 202, as in the case of line 401. Therefore in the example of line 402, the active elongated slot length is between the two extremes of the examples of lines 301 and 303.

A nominal force of 2600 N was tested and it was found that this force equated to a displacement of 0.68 mm in the case of line 402 (details of which are described above). All tests displayed in FIG. 11 looked for the force (N) required to cause this amount of displacement.

As can be seen in the plot, the force (N) required to cause 0.68 mm displacement by deformation varied by 699 N between the tested examples of line 401 and line 403.

This difference in force is less than half that found in the known assembly discussed in FIG. 10 (1500 N). Therefore the present invention allows for a more uniform force of clamping of the clamping rails 208 for different relative telescopic positions of the telescopic shroud 202.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. An adjustable steering column assembly, comprising a telescopic shroud which comprises an outer tubular portion and an inner tubular portion wherein the outer portion receives the inner portion such that the overall length of the shroud can be adjusted by relative movement of the two portions, a support bracket that in use is secured to a fixed part of a vehicle and a releasable clamp assembly which is movable between an unclamped position in which the shroud can be adjusted telescopically and a clamped position in which the outer tubular portion clamps onto the inner tubular portion thereby preventing telescopic movement of the shroud during normal use of the assembly, in which the outer tubular portion includes an elongated slot and two clamp rails, each located on a respective side of the slot and including an elongated opening through which a clamp bolt of the clamp assembly passes, the clamp assembly locking the shroud relative to the support bracket when in the clamped position, wherein at least one of the rails varies in cross-section at the various positions at which the rails may be clamped such that, in use, the rails resiliently deform when the assembly is in the clamped position by an amount dependent on the relative telescopic position of the inner and outer tubular portions due to differences in the cross-section of the rail at any given position.

2. The steering column assembly of claim 1, wherein the variation in cross-section of the clamp rails may be arranged such that the difference in the clamping force carried by the clamp bolt when the assembly is in any of the permissible clamped positions, between the shroud being fully extended and fully collapsed, is less than would be present with the rails having uniform cross-section with all other things being equal.

3. The steering column assembly of claim 1, wherein in at least one arrangement the variation in cross-section contributes to this variation being less than 40 percent.

4. The steering column assembly of claim 1, wherein in at least one arrangement the variation in cross-section contributes to this variation being less than 20 percent.

5. The steering column assembly of claim 1, wherein in at least one arrangement the variation in cross-section contributes to this variation being less than 10 percent.

6. The steering column assembly of claim 1, wherein in at least one arrangement the variation in cross-section contributes to this variation being zero percent.

7. The steering column assembly of claim 1, wherein during adjustment of the assembly, the inner tubular portion is fixed and the outer tubular portion moves relative to the support bracket causing the outer tubular portion to also move relative to the clamp bolt.

8. The steering column assembly of claim 7, wherein this movement is limited by the elongated opening length in the clamp rails.

9. The steering column assembly of claim 1, wherein the cross-section of at least one of the clamp rails at different positions, the clamp rails will deform by a greater amount when the shroud is at its shortest length and a lesser amount when it is at a longer length due to a difference in cross-section of the clamp rail at the point that the clamp bolt passes through the clamp position.

10. The steering column assembly of claim 1, wherein the cross-section of both the rails varies along the length of the rail.

11. The steering column assembly of claim 1, wherein the variation in cross-section is achieved by making the thickness of each rail, measured in the axial direction of the clamp bolt, vary along the length of the rail.

12. The steering column assembly of claim 1, wherein one of the rails is tapered so that one rails is thicker at the end which is closest to the free end of the outer tubular portion which surrounds the inner tubular portion and is thinner at distances further along the outer tubular portion, the width being measured in the axial direction of the clamp bolt.

13. The steering column assembly of claim 12 wherein both of the rails are tapered so that both rails are thicker at the end which is closest to the free end of the outer tubular portion which surrounds the inner tubular portion and is thinner at distances further along the outer tubular portion, the width being measured in the axial direction of the clamp bolt.

14. The steering column assembly of claim 1, wherein the sides of each clamp rail which face the support bracket are parallel to each other.

15. The steering column assembly of claim 1, wherein the outer tubular portion of the telescopic shroud is closer to the steering wheel than the inner tubular portion.

16. The steering column assembly of claim 1, wherein the outer tubular portion is a casting where the rails are cast as an integral part of the tubular portion.

17. The steering column assembly of claim 1, wherein the varying deformation of the rails with differences in shroud position/active elongated slot length may combine with the varying deformation of the slot with shroud position/active elongated slot length to provide a more uniform clamp force in moving from the unclamped to the clamped position compared with rails that do not have varying cross-section along their length.

18. A steering column assembly comprising the releasable clamp assembly of claim 1 that clamps the telescopic shroud in position relative to the support bracket, the clamp assembly including the clamp bolt onto which are stacked: two tapered clamp rails wherein the thickness of each rail, measured in the axial direction of the clamp bolt, varies along the length of the rail, of the telescopic shroud of the steering assembly each located on a respective side of the elongated slot of the shroud, the clamp rails including an elongated opening through which the clamp bolt of the clamp assembly passes, thus locking the shroud relative to the support bracket when in the clamped position, a cam mechanism comprising a fixed cam part and a moving cam part, the two parts each having a bore through which the clamp bolt passes, a thrust bearing and a locking nut which includes an internal thread that engages a complimentary thread on the clamp bolt and which is clamped down so as to apply an axial load to the thrust bearing.

\* \* \* \* \*